United States Patent
Wanda

(10) Patent No.: US 7,707,326 B2
(45) Date of Patent: *Apr. 27, 2010

(54) SYSTEM FOR SETTING PRINT END NOTIFICATION EITHER WHEN DATA TRANSMISSION ENDS OR WHEN PRINTING ENDS BASED ON PRINT CHECK ABILITY OF PRINTING DEVICES

(75) Inventor: Koichiro Wanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 11/843,249

(22) Filed: Aug. 22, 2007

(65) Prior Publication Data

US 2007/0299905 A1     Dec. 27, 2007

Related U.S. Application Data

(62) Division of application No. 10/449,324, filed on May 30, 2003, now Pat. No. 7,281,064.

(30) Foreign Application Priority Data

May 31, 2002    (JP)    ............................. 2002-160573

(51) Int. Cl.
    *G06F 3/00* (2006.01)
(52) U.S. Cl. ............................. 710/19; 710/18; 710/10

(58) Field of Classification Search ............... 710/5–19; 709/223, 203, 220; 358/1.13–1.15; 705/26
See application file for complete search history.

(56) References Cited

U.S. PATENT DOCUMENTS

| | | | |
|---|---|---|---|
| 5,758,070 | A | 5/1998 | Lawrence |
| 6,115,132 | A | 9/2000 | Nakatsuma et al. |
| 7,124,094 | B1 | 10/2006 | Kobayashi et al. |
| 2002/0030851 | A1 | 3/2002 | Wanda |
| 2002/0049837 | A1 | 4/2002 | Kato |
| 2002/0075508 | A1 | 6/2002 | Luman |
| 2002/0101604 | A1 | 8/2002 | Mima et al. |
| 2002/0152430 | A1* | 10/2002 | Akasaka et al. ............... 714/43 |
| 2003/0050971 | A1 | 3/2003 | Okuyama et al. |
| 2004/0046982 | A1 | 3/2004 | Jeyachandran et al. |

* cited by examiner

*Primary Examiner*—Christopher B Shin
(74) *Attorney, Agent, or Firm*—Fitzpatrick, Cella, Harper & Scinto

(57) ABSTRACT

An information processor sets timing for a print end notification to when printing by a network printer ends or when transmission of data to a print device ends. If the timing for the print end notification is set to when transmission ends, the print end notification (display) is performed when transmission of data to the network printer ends, while if the timing for the print end notification is set to when printing ends, the print end notification is displayed when printing by the network printer ends.

15 Claims, 16 Drawing Sheets

SYSTEM FOR SETTING PRINT END NOTIFICATION EITHER WHEN DATA TRANSMISSION ENDS OR WHEN PRINTING ENDS BASED ON PRINT CHECK ABILITY OF PRINTING DEVICES

This application is a divisional application of application Ser. No. 10/449,324, now allowed, filed May 30, 2003, which is incorporated herein by reference.

BACKGROUND OF THE INVENTION

1. Field of the Invention

The present invention relates to an information notification apparatus, an information notification method, a computer-readable program and a storage medium.

2. Related Background Art

Conventionally, there have been printing systems in which an information processor such as a computer and a plurality of printers (devices) are connected in a communicatable manner, the information processor receives a print end notification from any of printers that can perform a print check, i.e. a function to check the print status, and the information processor displays the print end notification on its display section. In such a print system, devices of models that can perform print check and devices of models that cannot perform print check can both be registered.

In the conventional print systems described above, for example, it may be desirous if a print end notification be displayed at the time when data transmission from an information processing apparatus to a device (i.e., a print device) ends, i.e., at the time of "completion of data transmission", when the device does not have the function to perform print check. Also, it may be desirous if a print end notification be displayed at the time when a device (i.e., a print device) confirms end of printing, i.e., at the time of "print confirmation", when the device has the function to perform print check.

However, such conventional examples entail the following problems: In a print system in which both devices of models that can perform print check and devices of models that cannot perform print check are registered, a setting for displaying a print end notification cannot be appropriately chosen among the cases upon completion of data transmission from an information processor to a device and upon completion of printing by the device. In addition, a default setting, which is automatically set when a user does not designate any setting, cannot be set in advance from a range of display settings for print end notification, which are relevant to capabilities of each device, and can be used for each device. Furthermore, if the print end notification setting is automatically changed due to impact from other settings, there was no way for the user to be informed that the print end notification setting had been changed.

SUMMARY OF THE INVENTION

The present invention allows a user to choose to have a print end notification performed either when job transmission ends or when printing ends based on difference in capabilities between print devices and the system in terms of their print check function.

The present invention makes it possible to set a default print end notification setting within the range of usable print end notification settings without a user's determining the capabilities of devices to be registered.

The present invention changes the print end notification setting automatically to a usable setting when other settings that impact the print end notification setting are changed and notifies the user that the print end notification setting has been automatically changed.

In accordance with an embodiment of the present invention, an information notification apparatus includes: an input unit for setting the timing to make a print end notification to when printing by a device ends or to when data transmission to the device ends; and a notification unit for making the print end notification when data transmission to the device ends if the timing for the print end notification is set to when transmission ends, and for performing the print end notification when the printing by the device ends if the timing for the print end notification is set to when printing by the device ends.

In addition, in accordance with another embodiment of the present invention, an information notification method includes: an input step of setting the timing to make a print end notification to when a device ends printing or when data transmission to the device ends; and a notification step of making the print end notification when data transmission to the device ends if the timing for the print end notification is set to when data transmission to the device ends, and making the print end notification when the device ends printing if the timing for the print end notification is set to when the device ends printing.

Furthermore, a computer-readable program in accordance with an embodiment of the present invention causes a computer to execute an input function for setting the timing to make a print end notification to a when a device ends printing or when data transmission to the device ends; and a notification function for making the print end notification when data transmission to the device ends if the timing to make the print end notification is set to when data transmission to the device ends, and for making the print end notification when the device ends printing if the timing for the print end notification is set to when the device ends printing.

Other objects, features and advantages of the invention will become apparent from the following detailed description taken in conjunction with the accompanying drawings.

DESCRIPTION OF THE PREFERRED EMBODIMENTS

The following is a detailed description, based on drawings, of preferred embodiments according to the present invention.

First Embodiment

Figure 1:
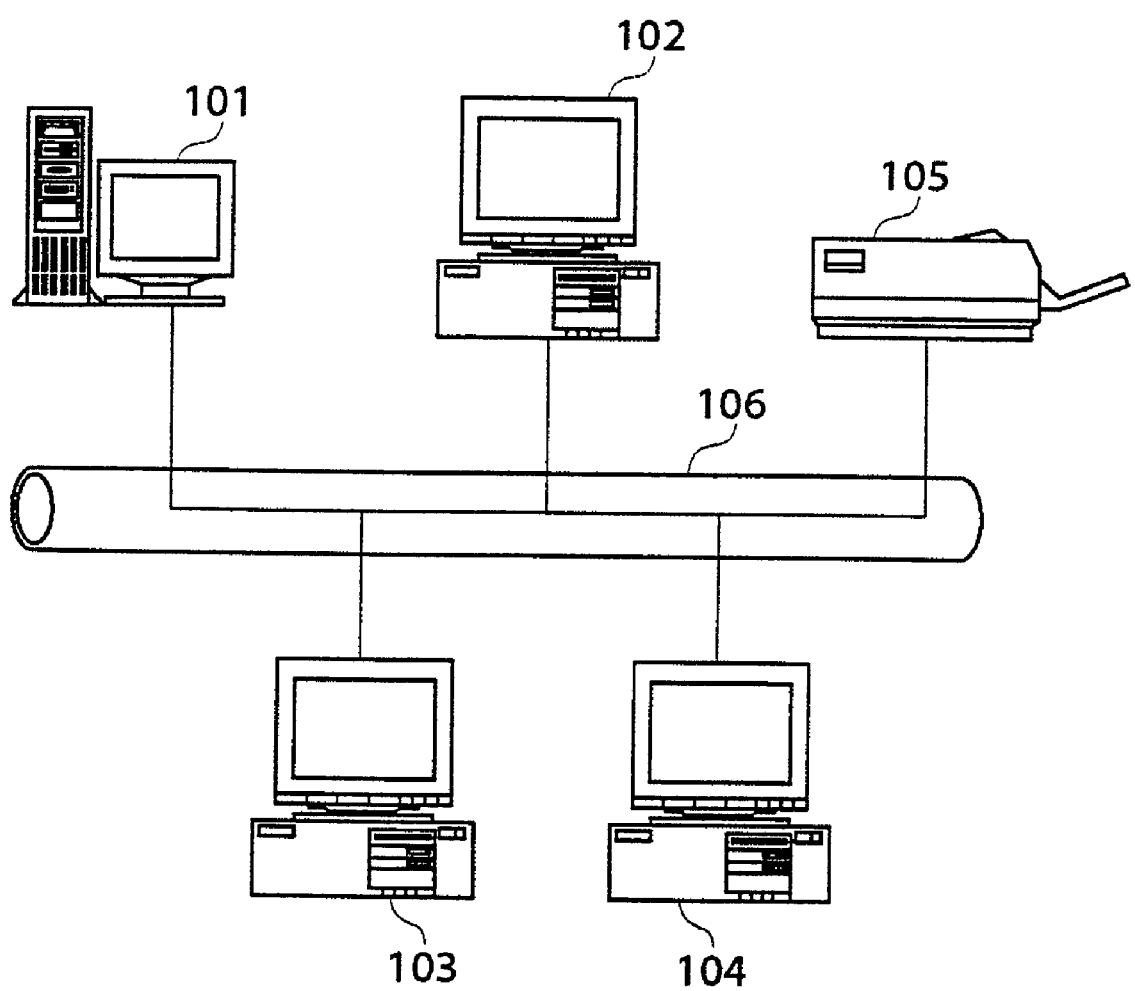
FIG. 1 shows a block diagram of a configuration of an information processing system in accordance with a first embodiment of the present invention.

First, a first embodiment of the present invention will be described below. FIG. 1 is a block diagram of the configuration of an information processing system according to the first embodiment. The information processing system comprises an information processor 101 as a server, information processors 102,103,104 as a plurality of client computers (hereinafter called "clients"), and a printer 105 as a plurality of network printers, which are mutually connected via a network 106. According to the present information processing system, one or a plurality of client computers is assumed to be connected to the system. In the present example, only one network printer is indicated in the drawing for the sake of convenience.

In FIG. 1, the information processors 102,103, 104 that serve as client computers (clients) are connected to the network 106 via network cables such as Ethernet®, are capable of executing various programs such as application programs, and have installed on them printer drivers with a function to convert print data into a printer language compatible with the network printer 105. The clients support a plurality of printer drivers. The network printer 105 may be of various types, such as a laser beam printer that uses the electrophotography method, an inkjet printer that uses the inkjet method, or a thermal transfer printer that uses the thermal transfer method.

The information processor 101 as the server (hereinafter called a "print server") according to the first embodiment is connected to the network 106 via a network cable, and it accumulates files used on the network 106 and monitors the usage status of the network 106. The print server 101 manages a plurality of network printers 105 connected to the network 106. According to the configuration of the first embodiment, the client computers 102-104 and the print server 101 are general information processors, and the client computers 102~104 and the print server 101 each stores in an executable manner a print control program that performs different controls.

The print server 101 may also have functions of the client computers 102~104. In addition, the print server 101 has functions to store and print print jobs containing print data requested to be printed by the client computer 102,103 or 104; to receive from the client computer 102,103 or 104 only job information that does not contain print data, manage print queue for the client computers 102,103 and 104, and notify to the client computer 102,103 or 104 whose turn in the print queue has arrived a transmission permission for a print job that contains print data; and to obtain status information on the network printer 105 and various print job information and notify such information to the client computer 102,103 or 104.

The network printer 105 which is a printing device is connected to the network 106 via a network interface, not shown, and it analyzes print jobs that contain print data sent from the client computers 102~104, converts the print data into dot images on a page-by-page basis, and print one page at a time. The network 106 is connected to the client computers 102,103, 104, the print server 101 and the network printer 105.

Figure 2:
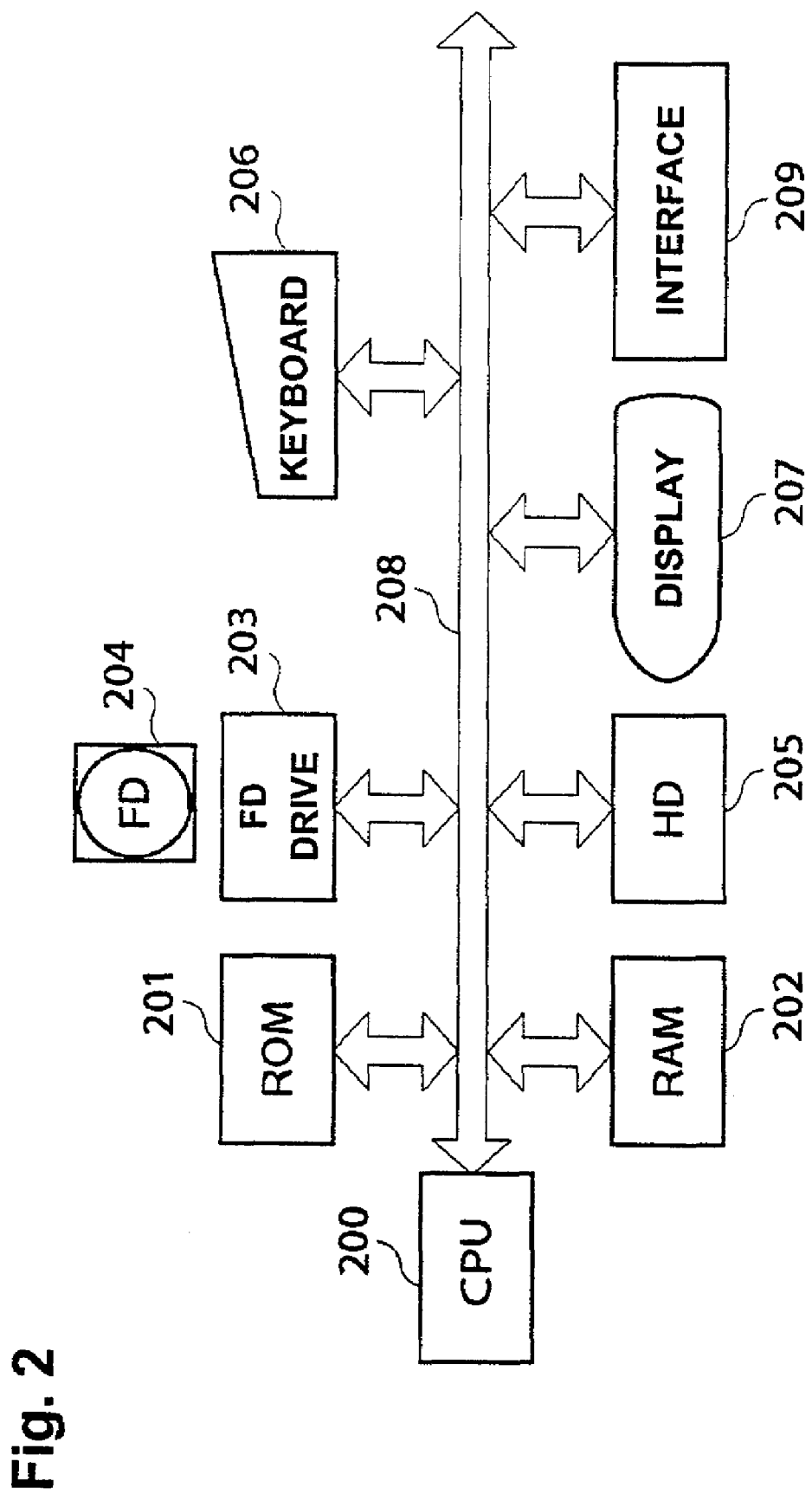
FIG. 2 shows a block diagram of a configuration of an information processor in accordance with the first embodiment.

FIG. 2 is a block diagram of the configuration of the information processor according to the first embodiment. The information processor is equipped with a CPU 200, a ROM 201, a RAM 202, a Floppy® disk (FD) drive 203, an FD 204, a hard disk (HD) 205, a keyboard 206, a display 207, a system bus 208 and an interface 209. The client computers 102,103, 104 which are information processors have the hardware configuration indicated in FIG. 2, and the print server 101 which is an information processor also has the hardware configuration that is the same as or equivalent to the configuration indicated in FIG. 2. Consequently, FIG. 2 will be described as a block diagram that describes the configuration of the client computers 102-104 and of the print server 101.

In FIG. 2, the CPU 200 is a control device for the information processor; it executes application programs, printer driver programs, an OS (operating system) and a network printer control program according to the present invention that are all stored on the hard disk (HD) 205, and performs a control to temporarily store in the RAM 202 information and files required for the execution of the programs. The ROM 201 is a read-only memory device and stores programs such as basic I/O programs and various data such as font data and template data used in document processing. The ROM 202 is a temporary storage device and functions as a main memory and a working area for the CPU 200.

Figure 5:
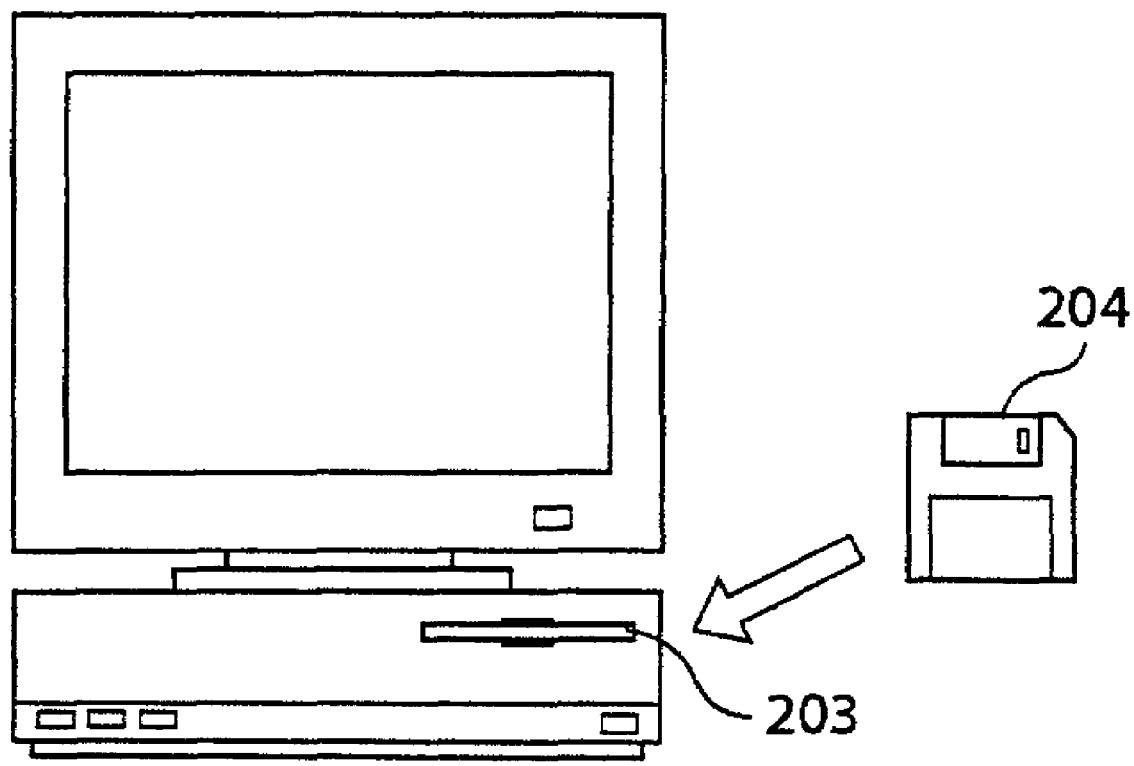
FIG. 5 shows a diagram indicating how a network printer control program and related data are supplied by an FD drive and an FD to the information processor in accordance with the first embodiment.

The FD drive 203 is a storage medium reading device and, as indicated in FIG. 5 described later, can load on the information processor (a computer system) programs stored on the FD 204 that serves as a storage medium. The storage medium is not limited to the FD and may be any other storage medium, such as a CD-ROM, CD-R, CD-RW, PC card, DVD, IC memory card, MO or a memory stick. The FD 204 is a storage medium that stores programs that the computer can read and is mounted in a detachable manner on the FD drive 203.

The hard disk (HD) 205 is one of external storage device and functions as a large capacity memory; it stores application programs, printer driver programs, the OS, a network printer control program and related programs. In addition, a spooler that serves as a spooling module is stored on the HD 205. The spooling module refers to a client spooler in the client computers 102-104 and to a server spooler in the print server 101. The print server 101 also generates and stores on the HD 205 tables for storing print jobs received from the client computers 102-104 and for controlling the print job queue.

The keyboard 206 is an instruction input device that a user uses to input and instruct such instructions as device control commands to the client computers 102-104, as well as an instruction input device that an operator or an administrator uses to input and instruct such instructions as device control commands to the print server 101. The display 207 is a display device that displays commands inputted through the keyboard 206 or the status of the network printer 105. The system bus 208 governs the flow of data within the information processor such as the client computers 102-104 and the printer server 101. The interface 209 is an input/output device; the information processors exchange data with external devices via the interface 209.

Figure 3:
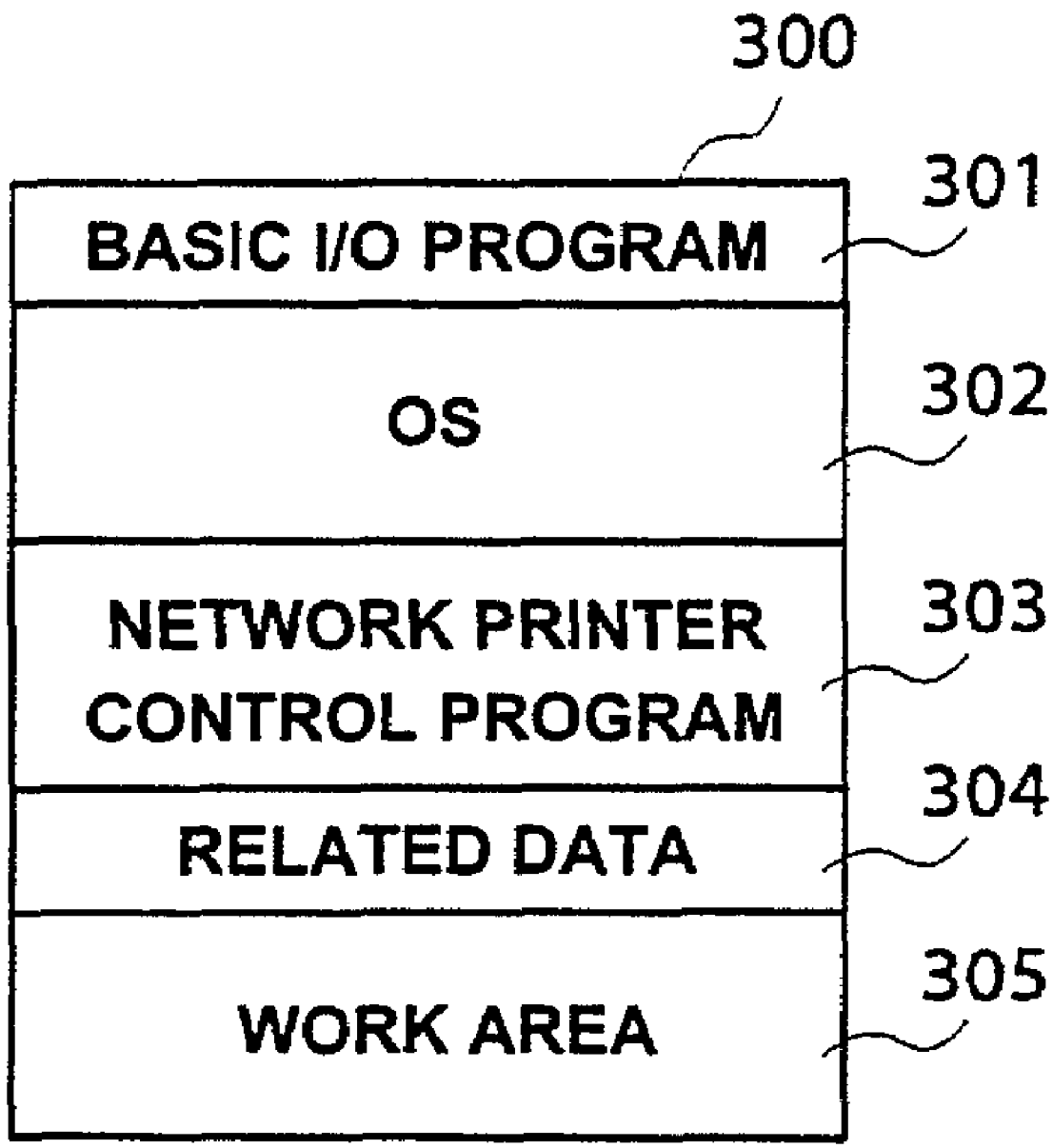
FIG. 3 shows a diagram of a configuration of a memory map of a RAM of the information processor in accordance with the first embodiment.

FIG. 3 is a diagram of an example of a memory map of the RAM 202 of the information processor shown in FIG. 2 and indicates a memory map when the network printer control program loaded from the FD 204 has been loaded onto the RAM 202 and has become executable. A memory map 300 of the RAM 202 comprises a basic I/O program 301, an OS 302, a network printer control program 303, related data 304 and a work area 305.

An example in which the network printer control program and the related data are directly loaded onto the RAM 202 from the FD 204 is indicated according to the first embodiment, but a network printer control program that is already installed on the HD 205 can be loaded onto the RAM 202 every time the network control program is operated through the FD 204. Further, the medium that stores the network printer control program may be a CD-ROM, CD-R, CD-RW, PC card, DVD, IC memory card, MO or a memory stick, in addition to the FD. The network printer control program can also be stored on the ROM 201 and made a part of the memory map through reconfiguration, and the CPU 200 can directly execute the network printer control program. Moreover, software that realizes functions equivalent to those of the devices described can be utilized as an alternative to the hardware apparatus.

The network printer control program is sometimes simply called a print control program. The print control program in the client computers 102-104 includes a program that controls instructions for changing print destination of print jobs and changing print queue; in the print server 101 the print control program includes a program that controls the queue of print jobs and notifies the end of print jobs and print destination change requests.

The print control program according to the present invention that performs such controls may be divided into a module that is installed on the client computers 102-104 and a module that is installed on the print server 101, or it may be a single print control program that functions as a print control program for a client computer or for a print server depending on the environment in which it is executed. Alternatively, a module with functions of the print control program for a client computer and a module with functions for a print server can both be installed on a single computer, where the two modules are operated in parallel simultaneously or pseudo-simultaneously through time division.

In FIG. 3, the basic I/O program 301 is a region with a program having IPL (Initial Program Loading) functions that cause the OS to be read from the HD 205 to the RAM 202 and the operations of the OS to begin when the power source of the information processor is turned on. The OS 302 is a region that stores the operating system. The network printer control program 303 is stored in a region reserved in the RAM 202. The related data 304 are stored in a region reserved in the RAM 202. The work area 305 has a region in which the CPU 200 executes the network printer control program.

Figure 4:
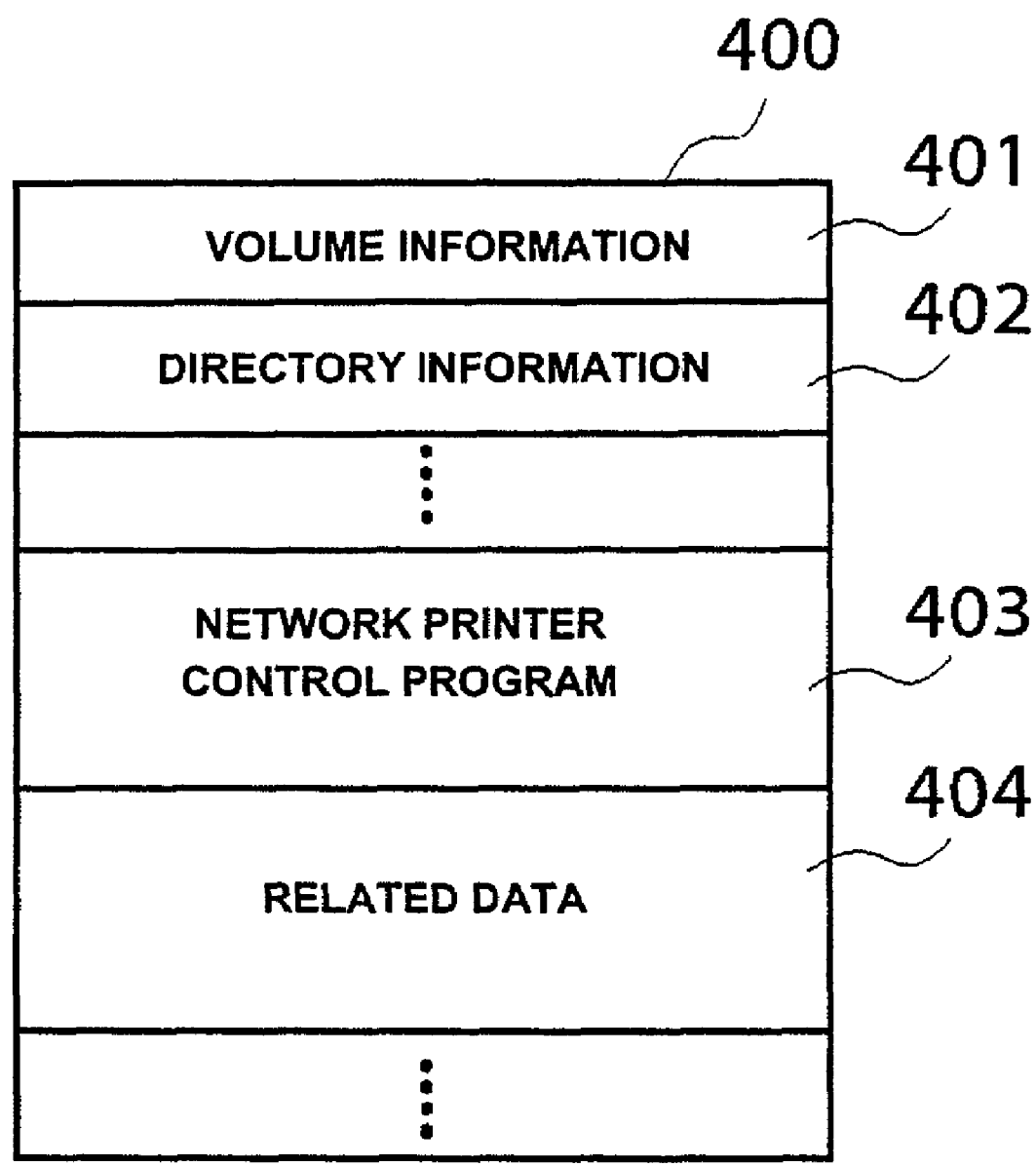
FIG. 4 shows a diagram of a configuration of a memory map of an FD of the information processor in accordance with the first embodiment.

FIG. 4 is a diagram of an example of a memory map of the FD 204 of the information processor in FIG. 2. The memory map of the FD 204 comprises volume information 401, directory information 402, a network printer control program 403 and related data 404.

In FIG. 4, reference numeral 400 denotes data contents of the FD 204. The volume information 401 indicates data information. The directory information 402 is file management information of the FD 204. The network printer control program 403 is the print control program described in the first embodiment. The related data 404 are data related to the network printer control program 403. The network printer control program 403 has been programmed based on a flowchart described in the first embodiment, and the network printer control program 403 has the same configuration in both the client computers 102-104 and in the print server 101 according to the first embodiment.

FIG. 5 is a diagram indicating how the network printer control program and the related data are supplied by the FD drive 203 and the FD 204 to the information processor in FIG. 2. Elements in FIG. 5 that are identical to elements in FIG. 2 are assigned the same numbers.

In FIG. 5, the FD 204 stores the network printer control program and the related data described in the first embodiment. The network printer control program and the related data are supplied to the information processor via the FD drive 203 and the FD 204.

Next, a description will be made as to a print job control system in the information processing system according to the first embodiment that performs print processing such as a distributed printing, in which a print job is distributed among a plurality of network printers to perform printing; a broadcast printing, in which a print job involving a plurality of copies is distributed among a plurality of network printers for each network printer to print one copy; and a substitute printing, in which a printing by a network printer is substituted by another network printer.

In the first embodiment, a driver, which can uniformly instruct print settings to individual printer drivers that each corresponds to one of a plurality of printer devices (network printers) and which generates base data (general-purpose document data) for generating general-purpose print files to allow a de-spooler (described in detail later) to notify a draw instruction to each printer driver, is called a group printer driver. Individual printer drivers that are dependent on print devices are called member printer drivers.

Figure 6:
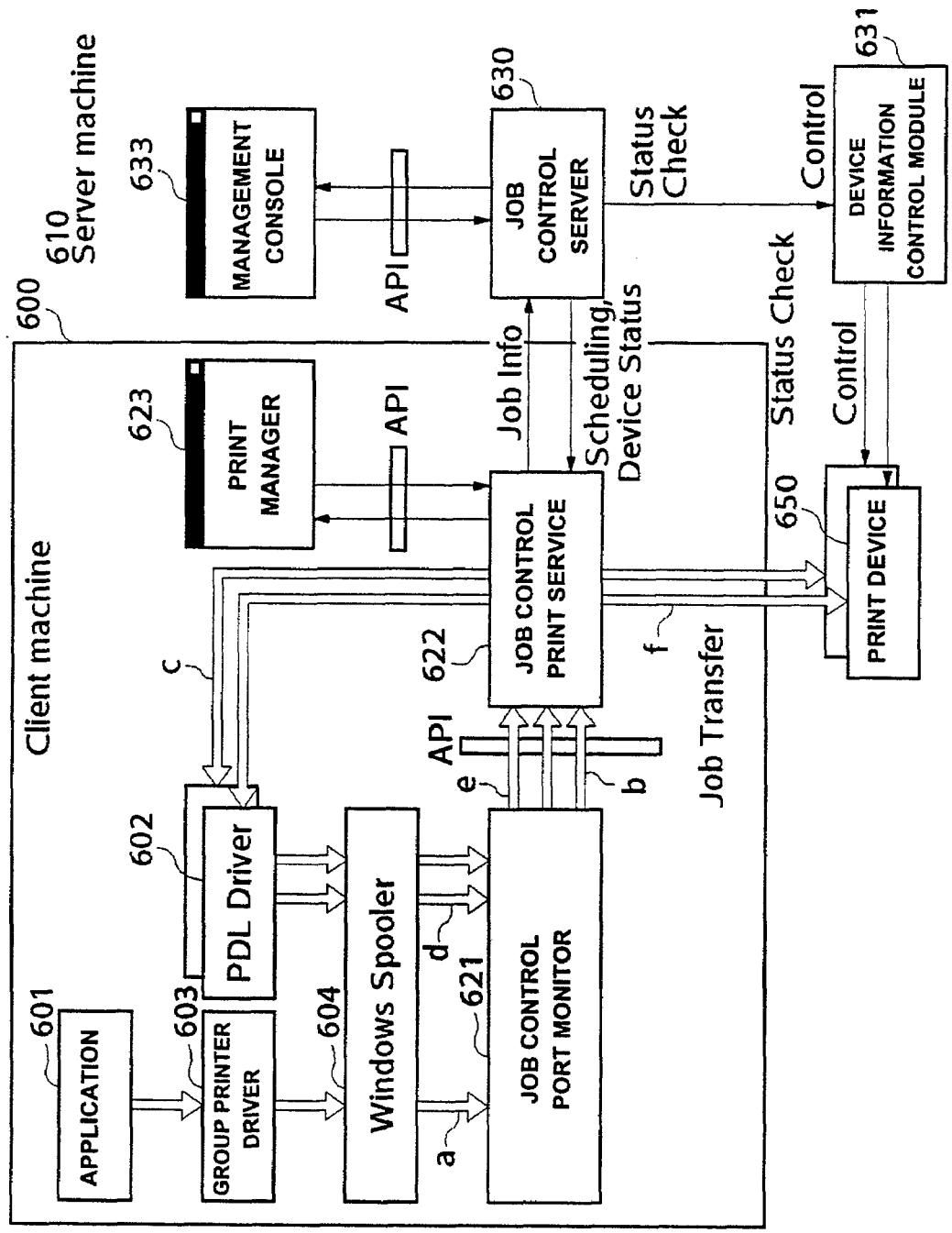
FIG. 6 shows a diagram indicating how a print job issued from a general application is processed in a print job control system in a client-server model of the information processing system in accordance with the first embodiment.

FIG. 6 is a diagram that indicates how a print job issued from a general application such as Microsoft Word® is processed in a print job control system in a client-server model of the information processing system.

In FIG. 6, a client machine 600 is a machine on which a client module of the print job control system operates. Normally, when an instruction to print is given, an application program 601 causes a series of draw instructions to be generated via an OS's graphic functions and transfers the draw instructions to a Windows® spooler 604 via a group printer driver 603. The Windows® spooler 604 transfers print job data to a port monitor selected by a user and performs a procedure to send the print job data to one or more print devices (printing devices) 650. According to the first embodiment, the user designates a port monitor for print job control system 621 (hereinafter simply referred to as a "job control port monitor" in the first embodiment) in advance and instructs printing.

The application program 601 generates a series of draw instructions via the OS. Upon receiving the draw instructions, the group printer driver 603 generates general-purpose document data, which are used to generate a general-purpose print file, and sends the general-purpose document data not to the port monitor that sends the print job data to the print devices 650, but to the job control port monitor 621 as print job data. Instead of sending the print job data to the print devices 650, the job control port monitor 621 sends the print job data to a print service for print job control system 622 (hereinafter abbreviated as a "job control print service").

The job control print service 622 is equipped with a function to manage job/device status managed by a server for print job control system 630 (hereafter simply referred to as a "job control server" in the first embodiment). Further, in situations in which the print devices 650 and the client machine 600 operate in a peer-to-peer connection environment (i.e., a connection environment without hierarchical relationship), the job control print service 622 also has functions to manage information on device status and job status notified from the print devices 650 and to issue predetermined instructions to the print devices 650. This is comparable to a function for managing device information and job information of a plurality of print devices 650.

A print manager for print job control system 623 (hereinafter abbreviated as a "job control print manager" in the first embodiment) is a program that provides a user interface (UI) that allows a user to check the status of a print job or to operate a print job within the job control print service 622. The job control print manager 623 sends and receives information to and from the job control print service 622 via a software interface (API: Application Program Interface) of the job control print service 622 and has a function to mainly obtain status information of the external print devices 650 managed by the job control print service 622 as events.

Among conceivable types of event notifications are notifications of error/warning information such as warnings to indicate low toner, communication failure between the client machine 600 and the print devices 650, insufficient memory, and a paper delivery tray full of paper; and a notification of normal status information to indicate that the normal status has been resumed from an error status.

The server for print job control system 630 (simply referred to as the "job control server" in the first embodiment) performs centralized control (i.e., scheduling) of the timing for the job control print server 622 in each client machine 600 to send print job data to the print devices 650. Additionally, the job control server 630 has a function to monitor printer status such as print in execution, power control status and failure information (paper jam) of each of the print devices (printing devices) 650 that is communicatable via a network, as well as a function to notify events to the job control printer service 622. However, with regard to monitoring changes in print status, the job control print service 622 can obtain notifications of changes in status (i.e., events) directly from the print devices 650.

A management console for print job control system 633 (hereinafter simply referred to as a "job control management console" in the first embodiment) can monitor the entire print job control system by exchanging information and instructions with the job control server 630 via an API that allows the job control server 630's software to access. Furthermore, the job control server 630 communicates with each print device 650 using a device information control module 631 and obtains and operates information concerning print jobs and operation status within each print device 650. The information obtained can be transferred to the job control print service 622 of the client machine 600.

Next, a description will be made as to a printing performed by the group printer driver 603 of the client machine 600 according to the first embodiment.

The group printer driver 603 generates general-purpose document data, as described above, based on a series of draw instructions generated by the application program 601. The general-purpose document data are converted into a general-purpose print file, which is a file in an intermediate format that is not dependent on the type of the print devices 650, by the job control print service 622. The configuration of the general-purpose print file will be described later.

As described earlier, the general-purpose print file is (a) transferred from the Windows® spooler 604 to the job control port monitor 621 and (b) led to the job control print service 622. The job control print service 622 (c) generates draw instructions based on the general-purpose print file according to the type of the job control to be performed for the print job, and a PDL (Page Description Language) driver 602 converts the draw instructions into a PDL file that the print devices 650 can interpret.

In FIG. 6, an example in which a job control to divide a print job into two print jobs in the job control print service 622 is shown, and the example of generating two member jobs is indicated by two arrows (c). The PDL files generated by the PDL driver 602 are (d) transferred to the Windows® spooler 604 and to the job control port monitor 621 and (e) transferred again to the job control print service 622. The job control print service 622 (f) sends print job data in PDL format to the print devices 650 according to instructions from the job control server 630.

The job control print service 622 follows print instructions contained in the general-purpose print file and logically divides one general-purpose print file into a plurality of print jobs and sends them to different print devices, or re-sends to a different printing device the print job data that had already been sent to another print device. Arrows (c), (d), (e) and (f) in FIG. 6 indicate the route of print job data in such cases.

On the other hand, if application software creates a general-purpose print file and directly sends the general-purpose print file as a print job, the manner in which information is transferred to the group printer driver 603 and the content of the processing that takes place in the group printer driver 603 differ from the manner in which these are processed in the case of a general application. As described above, when using a general application, the application program 601 calls up a GDI (Graphics Device Interface) function of the Windows®, as does ordinary printer drivers, when transferring draw information to the group printer driver 603; the group printer driver 603 generates general-purpose document data according to the GDI function; and the general-purpose document data thus generated are made into a general-purpose print file by the job control print service 622.

In contrast, in the case of an application that directly generates a general-purpose print file, the application program 601 has a general-purpose print file to begin with and supplies the file to the group printer driver 603. The group printer driver 603 rewrites as necessary, based on the print method set in advance, print instructions contained in the general-purpose print file and sends the result to the Windows® spooler 604.

Figure 8:
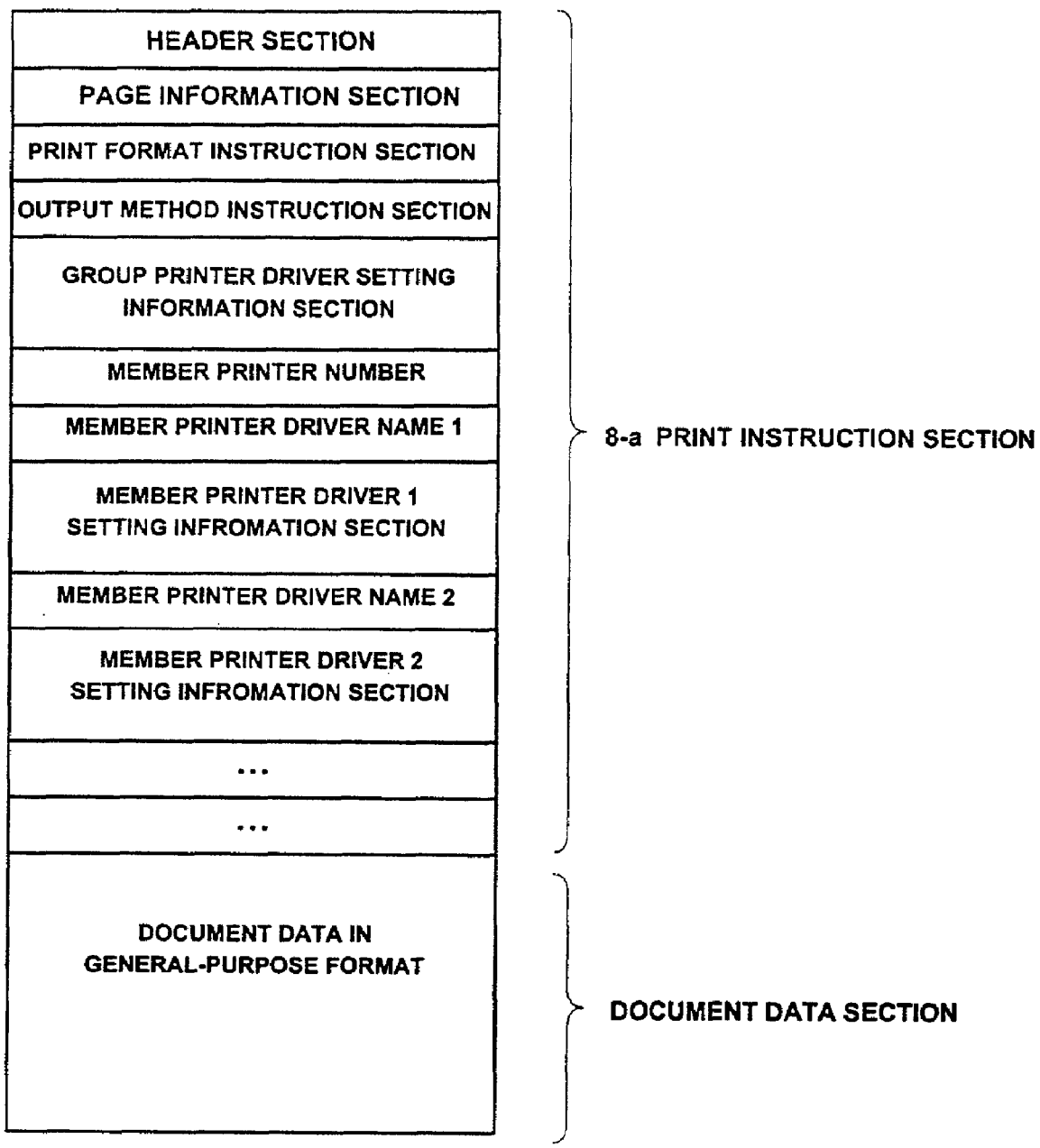
FIG. 8 shows a diagram of a configuration of a general-purpose print file in accordance with the first embodiment.

FIG. 8 is a diagram of an example of the configuration of a general-purpose print file. The general-purpose print file used in the first embodiment comprises a print instruction section 8-*a* and a document data section 8-*b*. The print instruction section 8-*a* is a part that describes document information and print instructions. The document data section 8-*b* is application data converted into general-purpose format data, namely data in a format that is not dependent on printer languages.

The print instruction section 8-*a* comprises a header section, a page information section, a print format instruction section, an output method instruction section, a group printer driver setting information section, a member printer number section, a member printer driver name section, and a member printer driver setting information section.

The header section is a part that stores information such as general-purpose print file version identification and file information. The page information section is a part that stores information such as the number of pages and the size of each page in document data contained in the document data section 8-b. The print format instruction section is a part that stores information relating to output format, such as printing page range, number of copies, document data imposition information (N-UP and binding printing), staple instructions and hole punching instructions. The output method instruction section is a part that stores information such as distributed printing, color-monochrome distributed printing, substitute printing and broadcast printing as an output method.

The group printer driver setting information section is a part that stores setting information of the group printer driver 603's UI, described later. The member printer number section is a part that stores the number of member printers to which the group printer driver 603 is correlated. The printer member driver name section stores the printer driver name of each member printer. The member printer driver setting information section stores driver UI setting information of each member printer, such as DEVMODE information. The member printer driver name sections and the member printer driver setting information sections each have storage areas in numbers that correspond to the number of the member printers registered in the member printer number section.

The group printer driver 603 described in FIG. 6 stores in the print instruction section 8-a the setting of its GUI (Graphical User Interface) when it generates the general-purpose print file. In addition, the group printer driver 603 converts the data received in the Windows® GDI into general-purpose data and records them as document data in the document data section 8-b of the general-purpose print file.

Next, referring to FIG. 7, the relations between a print system provided by Windows® and a print job in the print job control system, as well as the overview of processing, will be described in greater detail.

Figure 7:
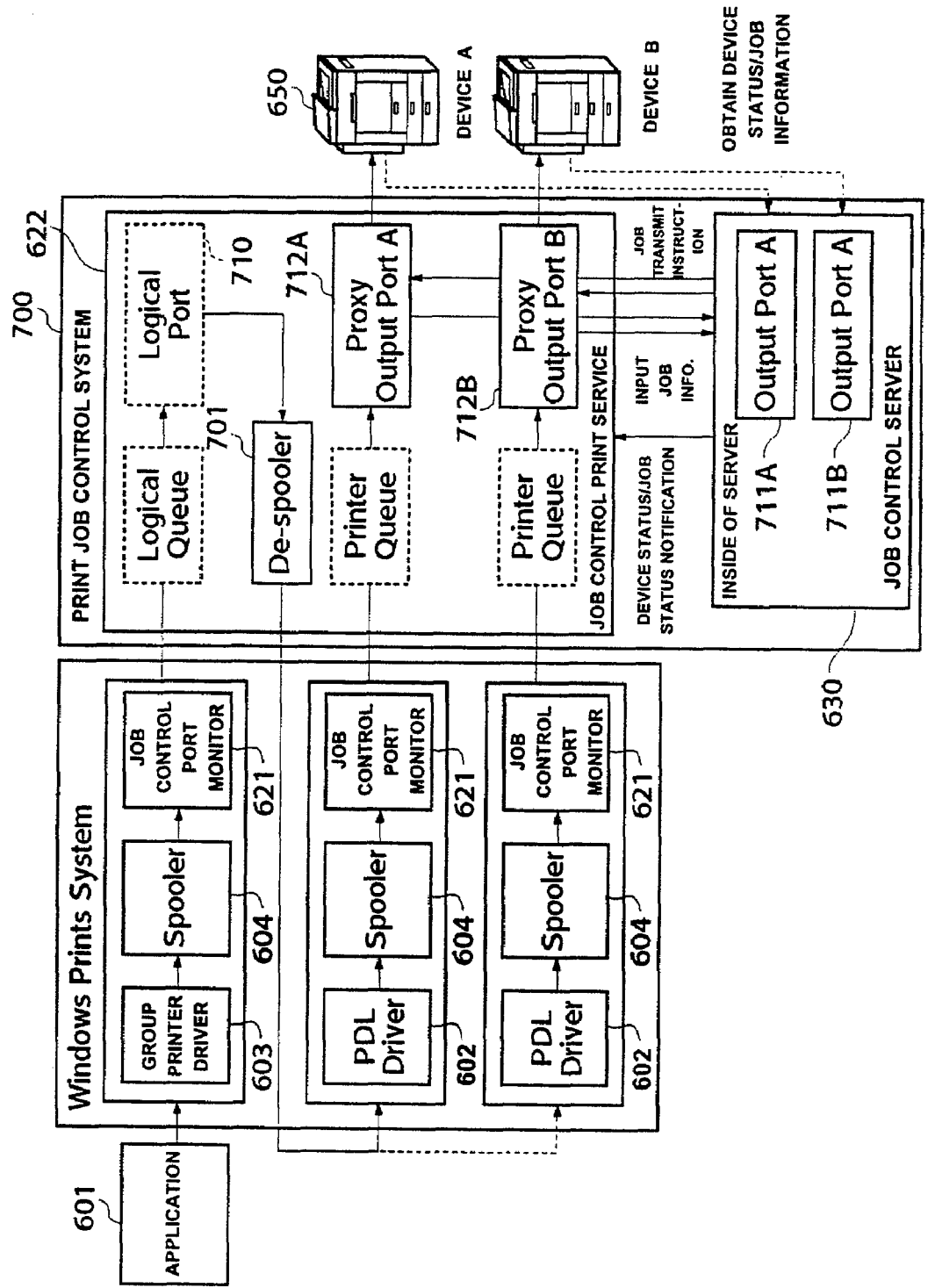
FIG. 7 shows a diagram indicating the relations between a print system and a print job in the print job control system, as well as the overview of processing, in accordance with the first embodiment.

A print job control system 700 in FIG. 7 represents the scope of a print job control system straddling physical machines on which server and client control programs operate. Output ports 711 (e.g., 711A and 711B in this embodiment) managed by the server are correlated to proxy output ports 712 (e.g., 712A and 712B in this embodiment) of the client's job control print service 622, such that the server comprehensively manages all proxy output ports on each of the clients correlated to each output port 711.

In the first embodiment, actual print job data are retained in the proxy output ports 712 of individual clients. The job control server 630 does not perform a send processing for the print job data itself, but only instructs the job control print service 622 to send print jobs. Based on such instructions, the client's job control print service 622 sends print job data to the print devices 650.

Next, a description will be made as to a processing that takes place when the print job control system 700 performs a value-added printing such as substitute printing, distributed printing or broadcast printing.

When the print job control system 700 performs a value-added printing such as substitute printing, distributed printing or broadcast printing, the user or the application program 601 must issue a print job to the print devices 650 allocated by the group printer driver 603, as described above. The job control print service 622 receives as a general-purpose print file via the job control port monitor 621 the job data that has been processed by the group printer driver 603. The job control print service 622 receives the job, and issues via a de-spooler 701 the job (i.e., member jobs) to different print devices for which the PDL drivers are allocated in order to have the print devices perform the printing.

When this takes place, the de-spooler 701 interprets the print instruction section 8-a of the general-purpose print file described in FIG. 8, processes document data in the document data section 8-b, converts them into Windows® GDI, gives print instructions to concerned printer drivers, and issues print jobs. For example, if an instruction for 2-UP is recorded in the print format instruction section of the print instruction section 8-a, document data for 2 pages are compressed and laid out on one page. When performing a distributed printing or broadcast printing, a job is issued to each of a plurality of member printers described in the print instruction section 8-a according to such settings. For substitute printing, when conditions for substitution are met, a member job is issued according to settings made in advance in automatic substitution and according to the user's operations in manual substitution. Furthermore, a mode in which a module other than the de-spooler 701 extracts instruction information corresponding to each member printer driver from the print instruction section 8-a and the de-spooler 701 interprets print instructions extracted for each member printer driver is also conceivable.

When issuing jobs to various member printers, the de-spooler 701 must create DEVMODE for each member printer as a print instruction that corresponds to each member printer driver, and the DEVMODE for each member printer is created by appropriately reflecting on it the content described in the print instruction section 8-a.

The client's job control print service 622 receives via the job control port monitor 621 the PDL data of various member jobs rendered by the PDL driver 602, notifies information concerning the jobs received to the server, and temporarily retains the job data in its proxy output queues (proxy output ports) 712. Thereafter, the job control print service 622 sends the job data to the print devices 650 upon receiving a transmission instruction from the job control server 630.

<Processing for Creating a Port>

Figure 9:
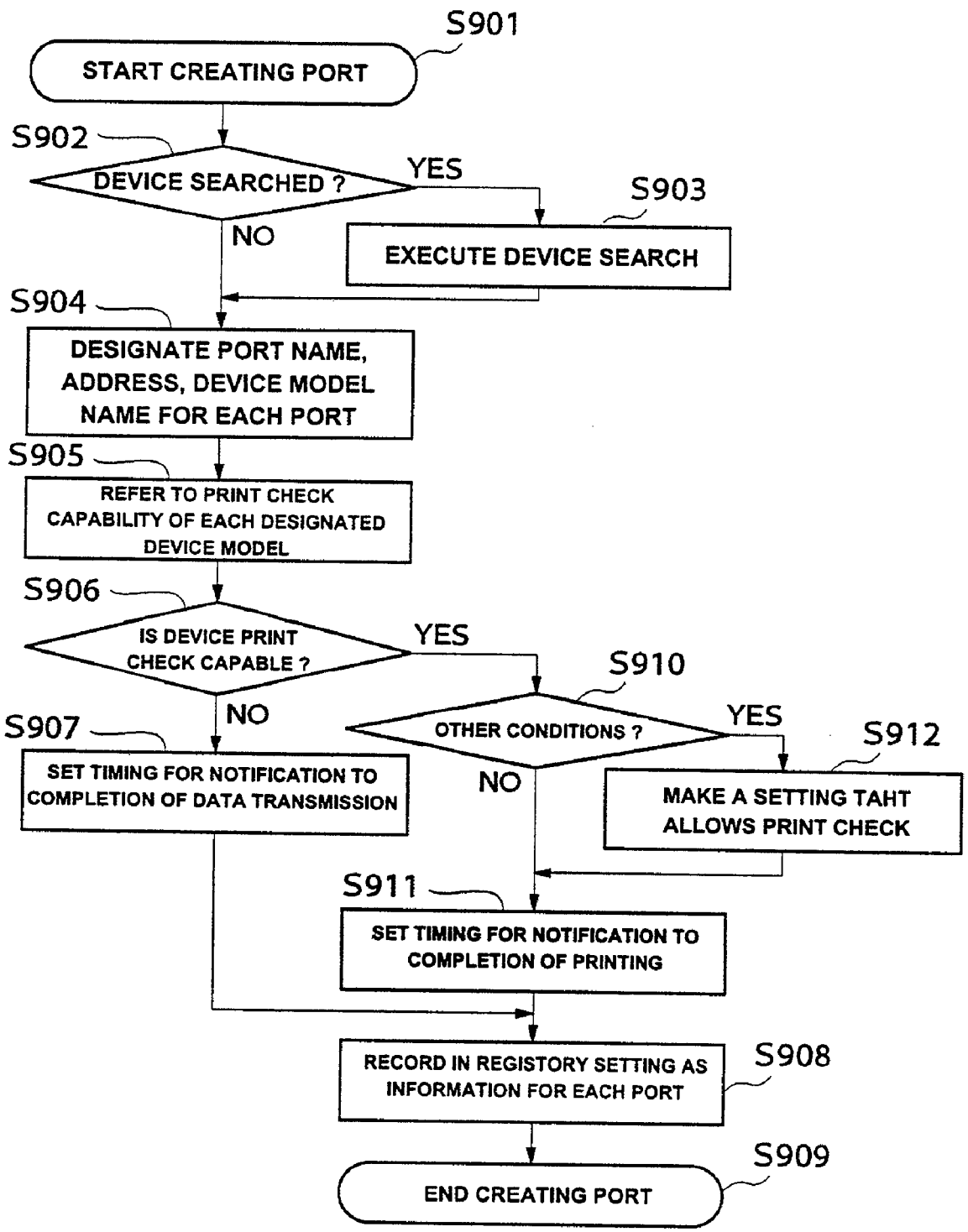
FIG. 9 shows a flowchart of a processing for creating a port in accordance with the first embodiment.

Next, referring to a flowchart in FIG. 9 and diagrams in FIGS. 11, 12, 13 and 14, a description will be made as to the processing to create a port correlated to a print device as a setting method in accordance with the first embodiment of the present invention. FIG. 9 is a flowchart of the processing to create a port. The flowchart in FIG. 9 is executed by the CPU 200 of the information processor (the print server 101 or the client computers 102-104) in FIGS. 1 and 2 based on the network printer control program according to the present invention and stored on the HD 205. Screens in FIGS. 11, 12, 13 and 14 are displayed on the display 207 of the information processor. On the display 207, RAW or LPR can be selected as the protocol between the information processor and the print device (see FIG. 11).

In the setting method according to the present embodiment, in step S901, a user begins to create a port correlated to a print device, which is a print job output destination; a UI for adding ports can be open, for example, in this step. According to the first embodiment, port creation is described as taking place by, for example, a user through a setting UI requesting the job control print service 622 on the same machine via the API to create a port and the port creation's being recorded as setting information for each port in a storage region of registry. However, if the port creation is recorded as setting information for each port and if it can be read when a UI for print end notification that notifies the end of printing by a print device is displayed on the display device of the information processor, the port creation is not dependent on any storage device. Further, the location for storing setting information for each port can be another PC or either the clients or server of one example of the first embodiment; it can be stored anywhere as long as it can be read before the UI for print end notification is displayed.

Next, in step S902, whether print devices correlated to the ports should be searched from the network is determined. If it is determined in step S902 to search for the print devices, print devices that can be set are searched from the network and a list of addresses and product names of print devices that can be used on the network and are found as a result of the search is displayed in step S903. Such a search can be realized by using such scheme as broadcast-transmitting SNMP (Simple Network Management Protocol) packets and analyzing reply packets, for example. However, the method to search for print devices does not dependent on protocols or print device selection methods, and any one of methods to search for print devices that may be used by the system according to the present invention can be adopted. Furthermore, if the user knows addresses of print devices to be correlated and other information required for the setting, the user can proceed to step S904 and create a port.

Figure 11:
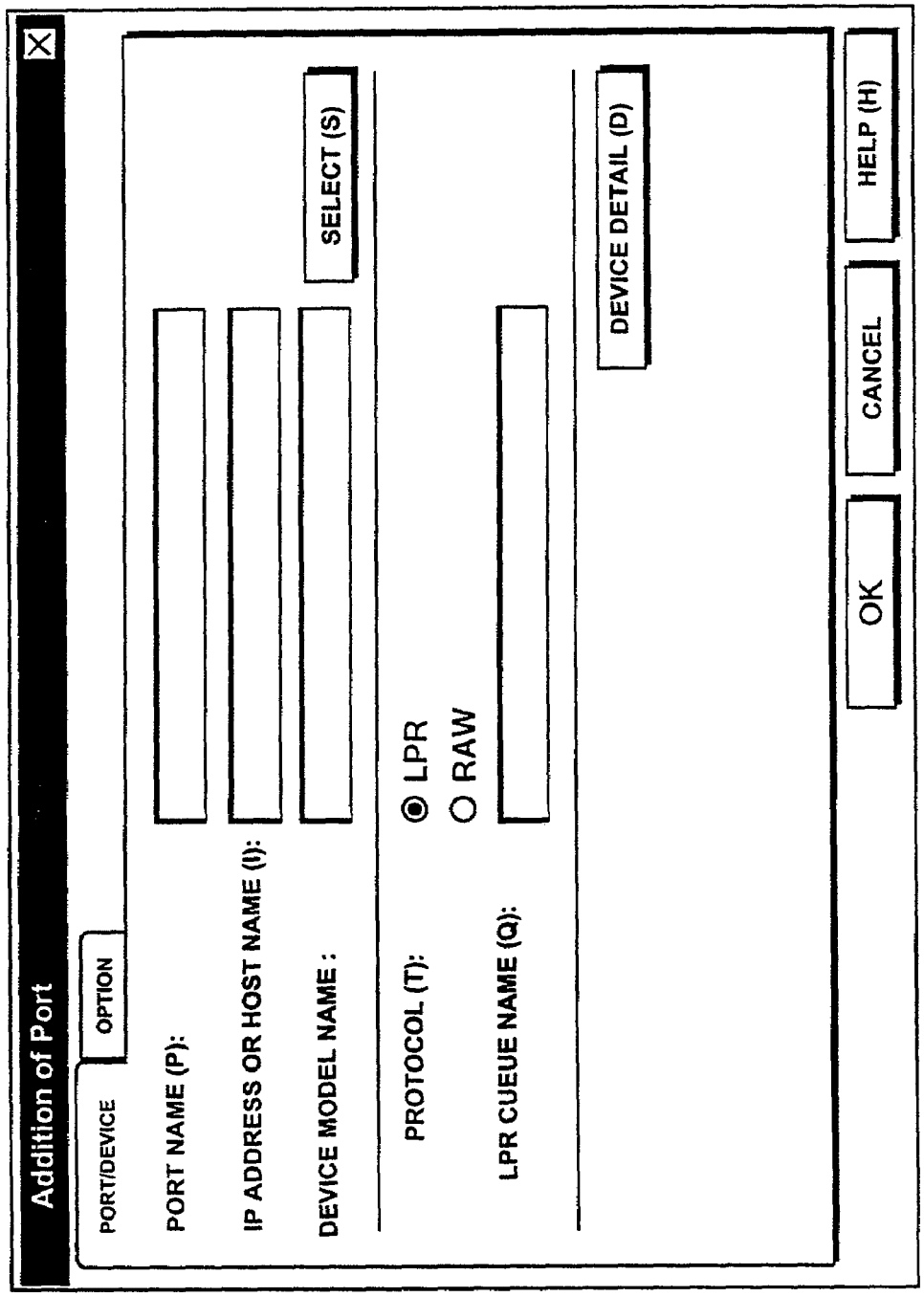
FIG. 11 shows a diagram of a port adding screen in accordance with the first embodiment.

Next, in step S904, the user designates the name of the port to be created, the address of the print device to be correlated to the port, and device model name using a UI shown in FIG. 11, for example. In the first embodiment, the device model name is information that specifies the print device type and a plurality of print devices can be represented under one device model name if there is no difference among them in terms of equipment control; the device model name does not necessarily have to be a product name and can be any information that identifies the type of print device in a manner required for other functions of the present system.

Next, in step S905, an ini file (initialized file: a file that records setting information for Windows® applications) is referred to regarding whether each device model designated has the capability to execute a print check function and whether the execution of the print check function would be changed as a result of setting conditions of other functions. If it is determined in step S906 that a device model is not a print device that can execute the print check function, the timing for displaying the UI for print end notification is set, in step S907, in a detailed setting for each port to "when data transmission to the print device is completed" (hereinafter referred to as "Upon completion of data transmission"), and the timing setting for print end notification for a print device that cannot execute the print check function is set so that the timing setting for print end notification cannot be set to "when printing by the print device is completed" (hereinafter referred to as "Upon completion of printing"). When the user inputs settings required to add a port and presses the OK button, the settings are recorded in a registry as setting information for the port in step S908 and the processing to create a port is terminated in step S909.

Figure 12:
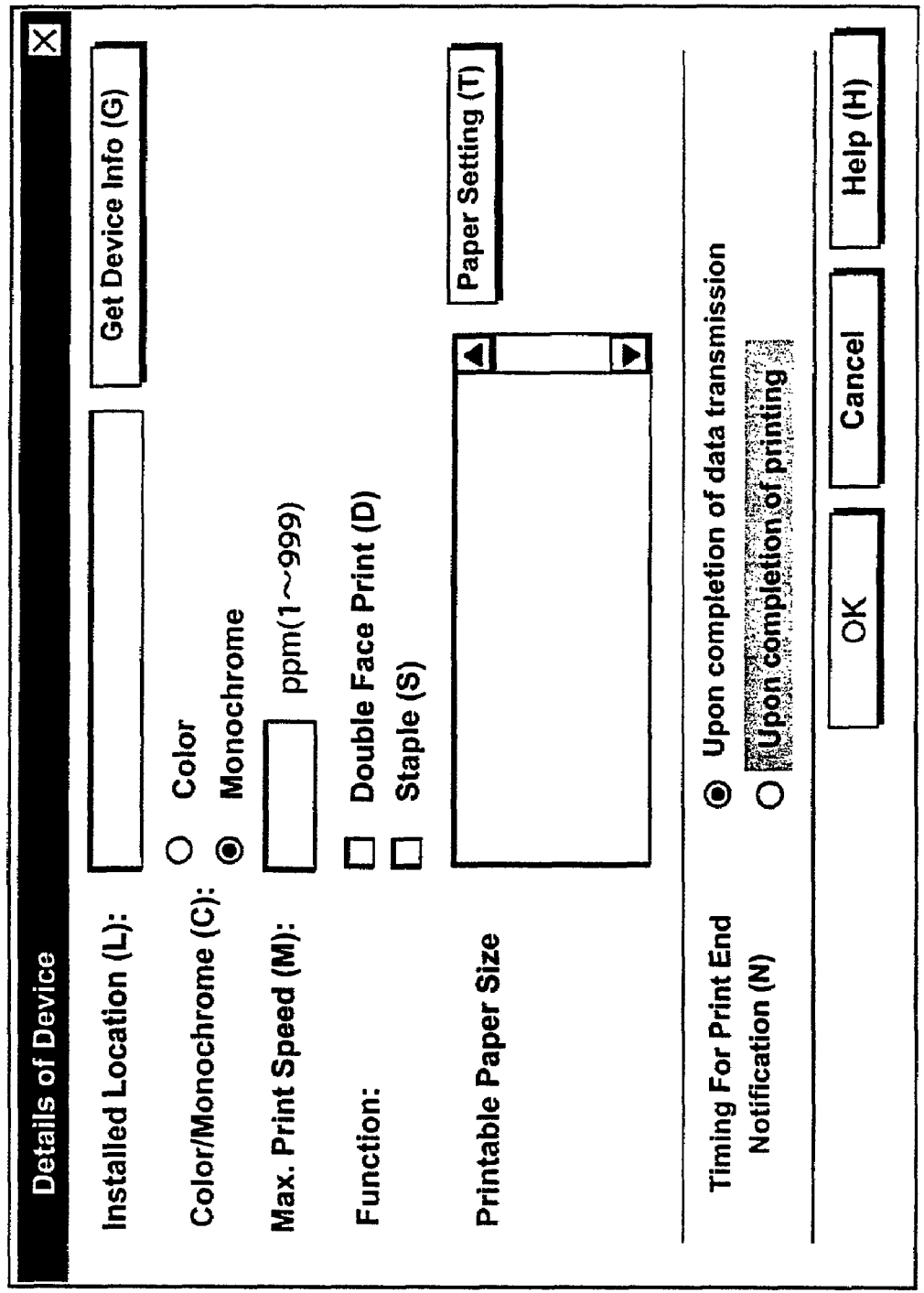
FIG. 12 shows a diagram of a device's detail tab screen in accordance with the first and second embodiments.

Although not necessarily required for the processing to add ports, one example of making it impossible to change the timing for print end notification for a print device that cannot execute the print check function to "Upon completion of printing" is to gray out a radio button as in FIG. 12, so that the radio button cannot be selected; in this way, the current timing setting for print end notification can be displayed, while making it impossible to change the timing setting for the print end notification to "Upon completion of printing". The print end notification may be in any of other forms, such as, for example, "Upon confirmation of completion of printing", etc.

In the meantime, if it is determined in step S906 that the device model correlated to the port being created can execute the print check function, whether the print check function can be executed without being dependent on other setting conditions is determined in step S910. If it is determined in step S910 that the port is to be created for a device model that can unconditionally execute the print check function, the processing proceeds to step S911, where the timing for print end notification is set to "when printing by the print device is completed" (hereinafter referred to as "Upon completion of printing"); next the processing proceeds to step S908, where the settings are recorded in the registry as information for the port, and to step S909, where the processing to add the port is terminated.

Figure 13:
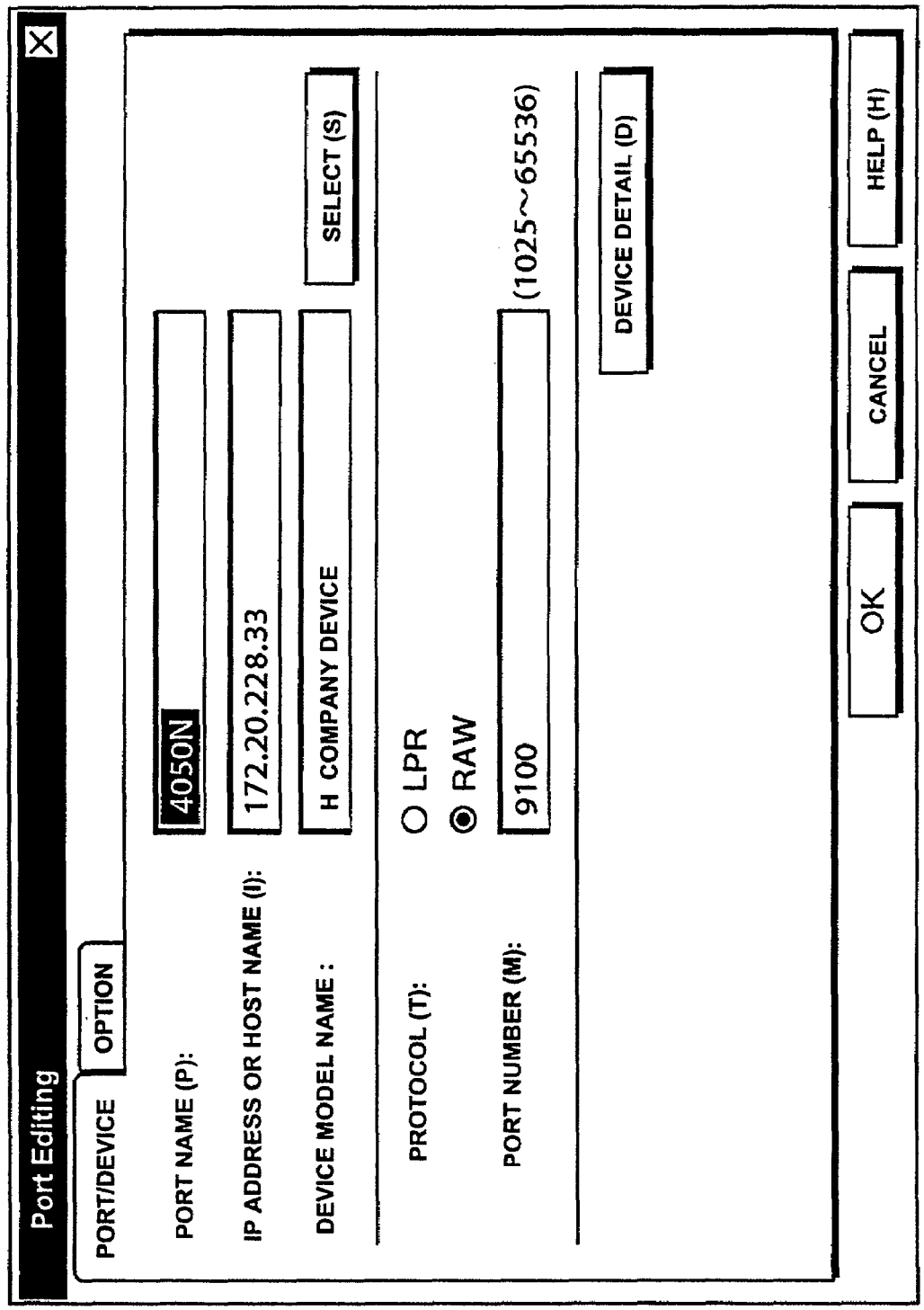
FIG. 13 shows a diagram of a port editing screen in accordance with to the first and second embodiments.

On the other hand, even if a device model is set as a device model that can execute the print check function, if the device model is determined in step S910 as a device model that cannot execute the print check function due to other setting conditions that impact devices to perform the job print check, the processing proceeds to step S912 to create a port whose setting conditions allow the port to execute a print check as part of its default values. For example, in a device model that can execute the print check function using port 9100 in RAW mode but cannot execute the print check function when a job is sent in LPR (Line Printer Remote: a remote print protocol used when a printer is shared in TCP/IP), a setting to send jobs in RAW mode for the port 9100 is set as the default setting, as shown in FIG. 13. Next, in step S911, the timing setting for the print end notification is set to "Upon completion of printing". Next, the settings are recorded in the registry as setting information for the port in step S908 and the processing to create a port is terminated in step S909.

Figure 14:
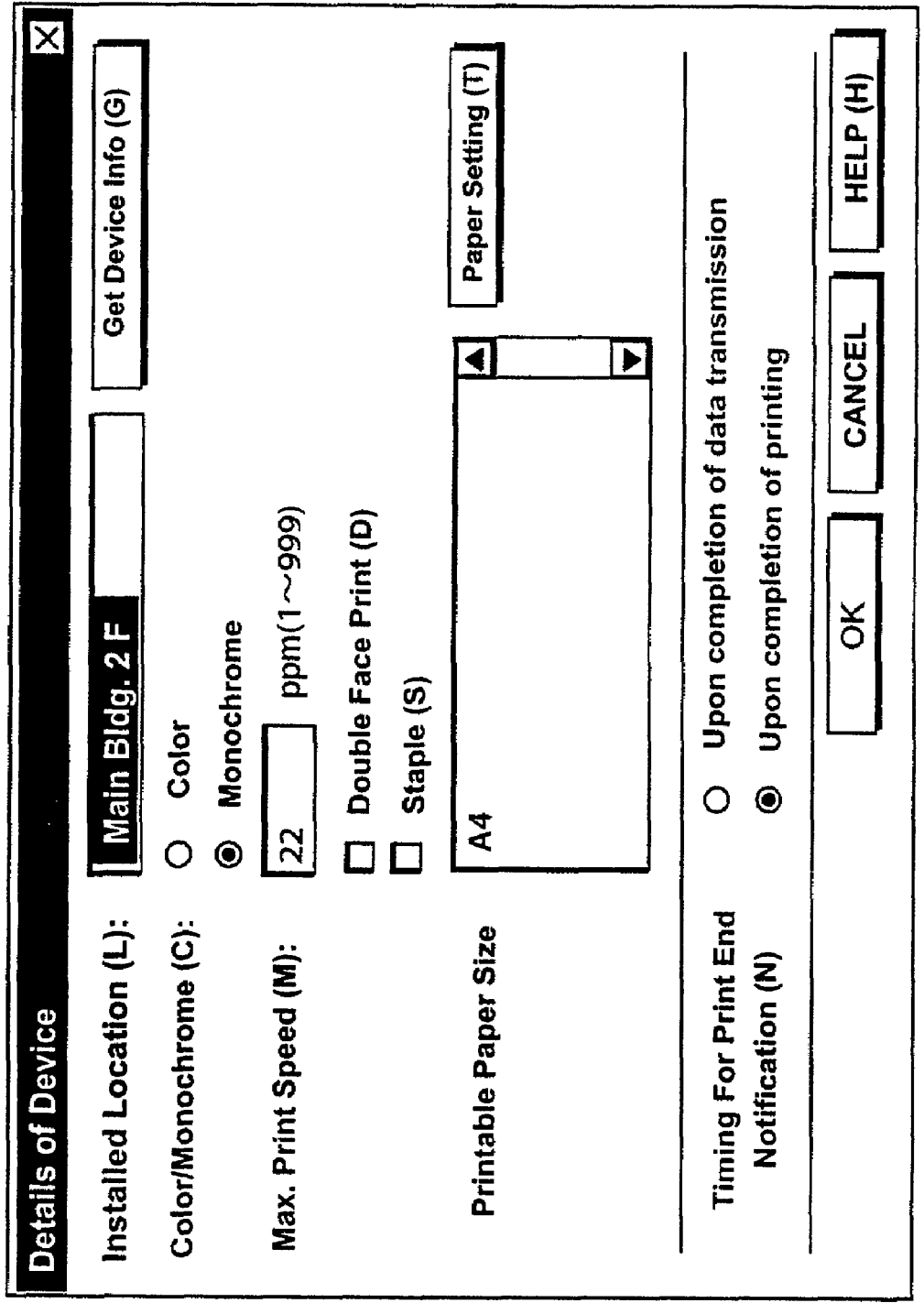
FIG. 14 shows a diagram of a device's detail tab screen according to the first embodiment.

If a device model can execute the print check function, the user can select the timing for the print end notification as either when printing ends (i.e., "Upon completion of printing") or when transmission ends (i.e., "Upon completion of data transmission"). As a result, when creating a port with settings of a device model that can execute the print check function, the user has the choice of setting the timing for the print end notification as either when transmission ends or when printing ends, as shown in FIG. 14, unlike with devices that cannot execute the print check function.

The processing to create a port as the first embodiment of the present invention can be realized through the procedure described above.

<Print End Notification Processing>

Figure 16:
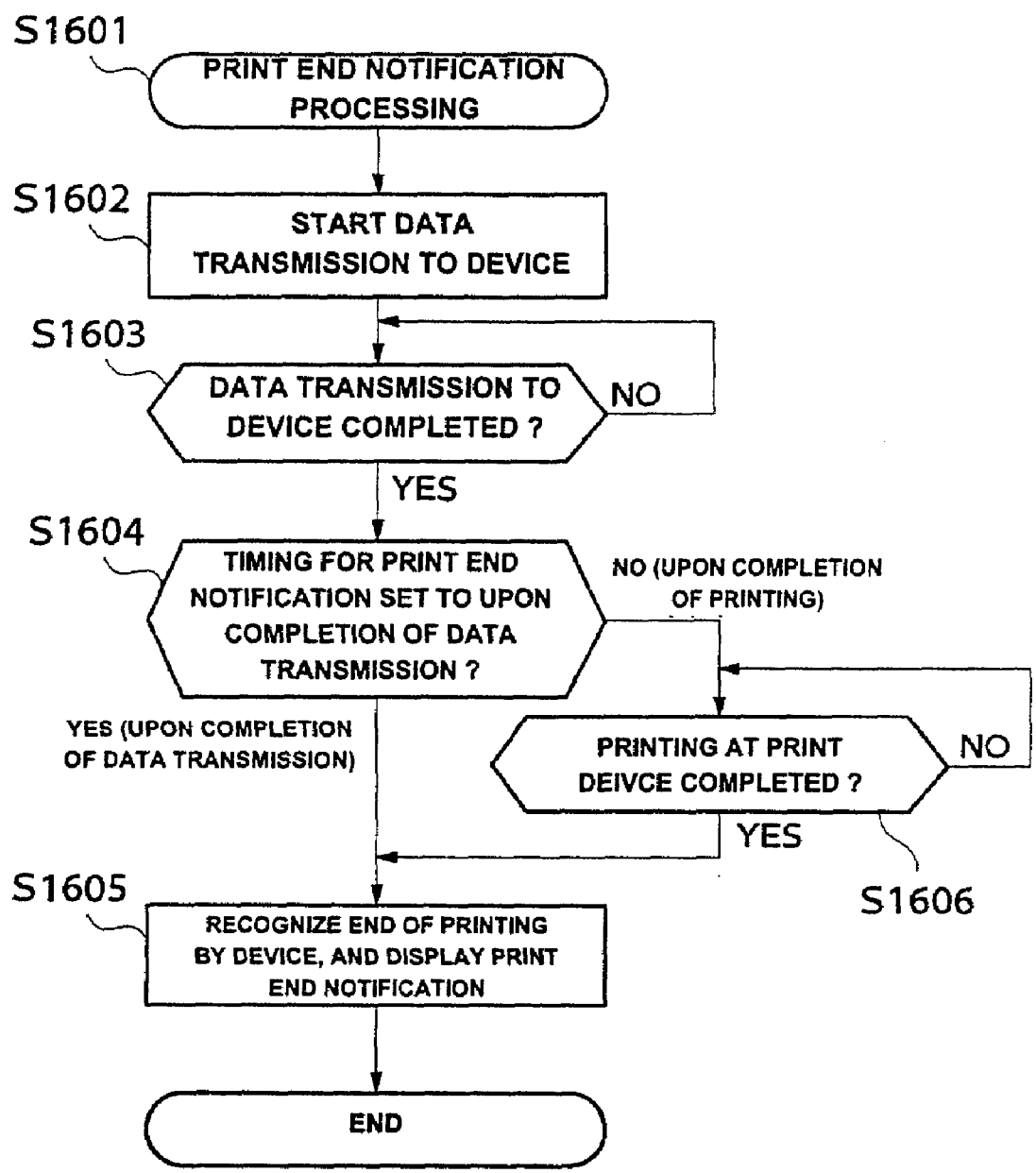
FIG. 16 shows a flowchart of a print end notification processing in accordance with the first embodiment.

Next, a description will be made as to a print end notification processing with reference to FIG. 16. FIG. 16 shows a flowchart of the processing to perform a print end notification (display) based on settings in the flowchart in FIG. 9 and in a flowchart in FIG. 10, which will be described in detail under the second embodiment, as well as on the settings in the screen in FIG. 14. The flowchart in FIG. 16 is executed by the CPU 200 of the information processor (the print server 101 or the client computers 102-104) in FIGS. 1 and 2 based on the network printer control program according to the present invention and stored on the HD 205.

The print end notification processing starts in step S1601 and data transmission to a print device begins in step S1602. In step S1603, whether the data transmission to the print device has finished is determined. If it is determined that the data transmission has finished, the processing proceeds to step S1604. In step S1604, a determination is made as to whether not the timing for the print end notification is set to "Upon completion of data transmission" in the settings in FIGS. 9 and 10 and in the setting of the screen in FIG. 14. If it is determined in step S1604 that the timing is set to "Upon completion of data transmission", the processing proceeds to step S1605, where the end of printing is recognized and a print end notification (display) is performed on the display 207.

If it is determined in step S1604 that the timing for print end notification is not set to "Upon completion of data transmission", i.e. if it is determined that the timing for print end notification is set to "Upon completion of printing", the processing proceeds to step S1606, where it is determined whether printing by the print device has finished. The determination method employed in this step can be a determination of print completion based on a reception of a print completion signal from the print device. If the job involves printing 20 pages, for example, receiving 20 paper delivery signals, each of which is outputted every time the print device prints one page, can be determined as the completion of printing. If it is determined in step S1606 that the printing has finished, the processing proceeds to step S1605, where the end of printing is recognized and a print end notification (display) is performed on the display 207.

The processing in FIG. 16 can be applied to distributed printing in which a print job is distributed among a plurality of print devices to perform printing; in this case, a print end notification is performed in step S1605 for each print device designated in distributed printing, and when the print end notification has been performed for all print devices, a distributed print end notification (display) can be performed on the display 207.

The print end notification processing as the first embodiment according to the present invention can be realized through the procedure described above.

As described above, there is an effect according to the first embodiment that allows a user to choose between a setting under which a print end notification is displayed when data transmission to a print device ends and a setting under which a print end notification is displayed when a print device ends printing based on the difference in capabilities between print devices and the system in terms of their print check function. Furthermore, there is another effect that allows the default print end notification setting to be set within the range of usable print end notification settings even when the user does not determine the capability of a print device to be registered with the system.

Second Embodiment

Next, a second embodiment of the present invention will be described below. The configuration of an information processing system (FIG. 1), the configuration of an information processor according to the information processing system (FIG. 2), the overview of processing in a print job control system for a print job issued by a general application in a client-server model of the information processing system (FIG. 6), and the relations between a print system and a print job in the print job control system, as well as the overview of processing (FIG. 7) according to the second embodiment are the same as the first embodiment and their descriptions are therefore omitted.

<Processing for Changing Port Settings>

Figure 10:
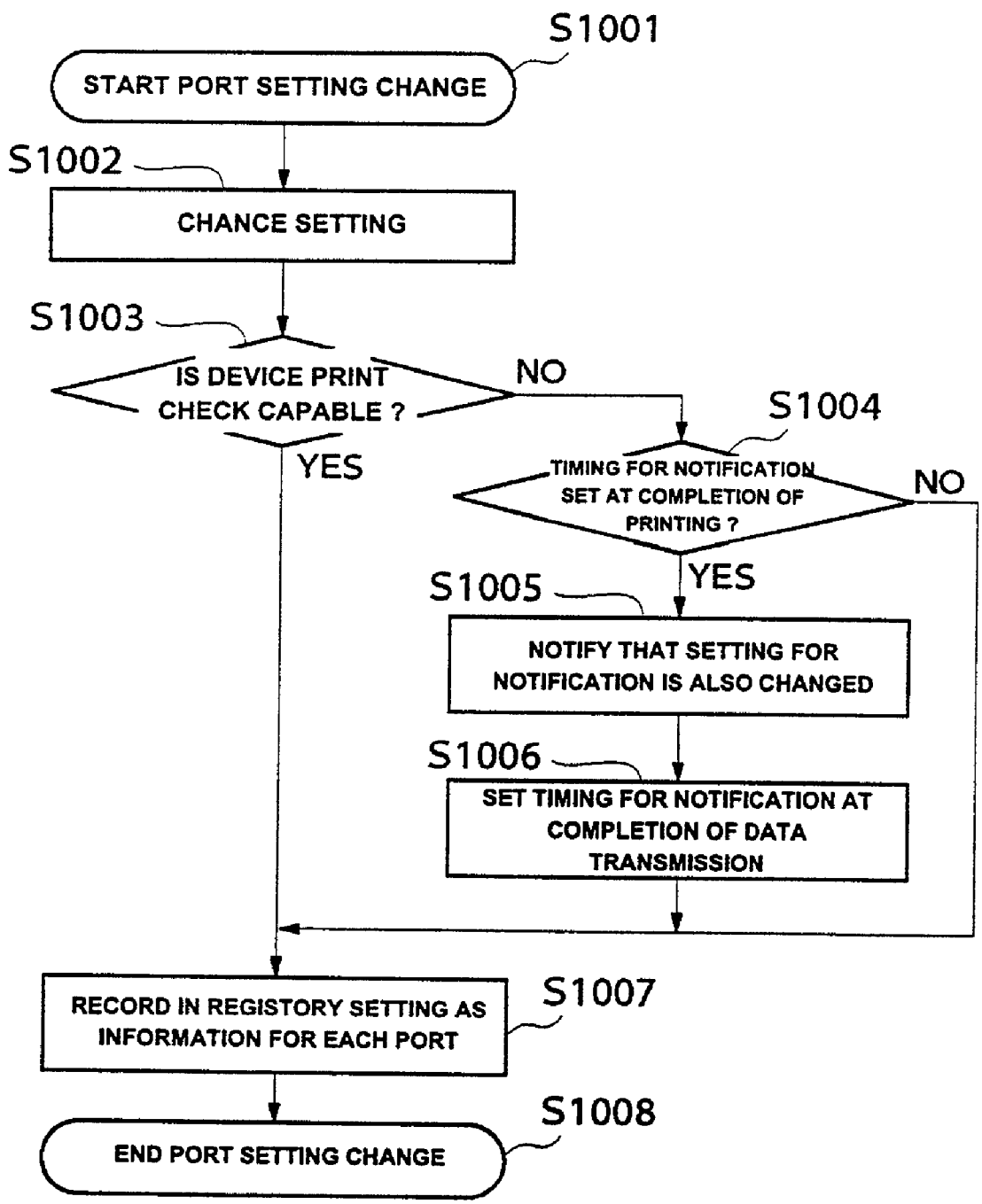
FIG. 10 shows a flowchart of a processing for changing port settings in accordance with a second embodiment of the present invention.
Figure 15:
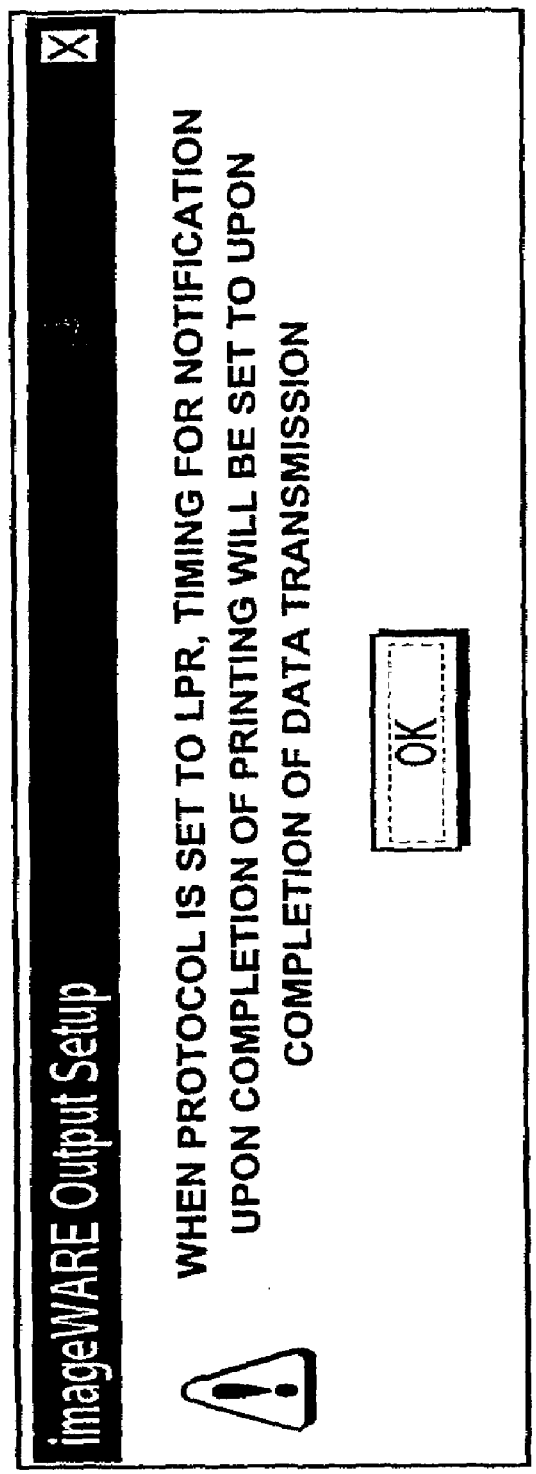
FIG. 15 shows a diagram of a setting change message for print end notification timing in accordance with the second embodiment.

Next, a description will be made below as to a processing for changing settings of a port correlated to a print device in accordance with the second embodiment of the present invention with reference to a flowchart in FIG. 10 and diagrams in FIGS. 12, 13 and 15. FIG. 10 is a flowchart of the processing for changing port settings. The flowchart in FIG. 10 is executed by a CPU 200 of an information processor (a print server 101 or client computers 102-104) in FIGS. 1 and 2 based on a network printer control program stored in an HD 205. Screens in FIGS. 12, 13 and 15 are displayed on a display 207 of the information processor.

The procedure in the second embodiment is applicable to any setting changes as long as the changes are for port settings, but first a description will be made as to a situation in which a port has already been created, where the port is correlated to a device model that can execute a print check function and whose timing setting for a print end notification can be changed as a result of other settings.

Step S1001 is applicable when beginning a setting change of a port that has already been created, and any setting change may be performed as long as the change is for a port setting. In step S1002, if the setting change is a change that does not affect the execution of the print check function, such as port name, the processing proceeds to step S1003. In step S1003, since it is known that the device model can execute the print check function, the processing proceeds to step S1007 instead of changing the timing setting for print end notification; in step S1007, the changed setting is stored in a registry as setting information for each port and in step S1008 the port setting change processing is terminated.

If a setting change that affects the execution of the print check function is made in step S1002, for example, if a port setting change that affects the timing setting for print end notification such as changing the protocol of port 9100 from RAW mode to LPR for a port correlated to a device model that can execute the print check function in the RAW mode for port 9100 but cannot execute the print check function when a job is transmitted in LPR, for example, is made in step S1002, a determination is made in step S1003 as to whether the setting allows the device to execute the print check function. If it is determined in step S1003 that the setting does not allow the device to execute the print check function, it is determined in step S1004 as to whether the current timing setting for the print end notification is set to "Upon completion of printing".

If it is determined in step S1004 that the timing setting for print end notification is set to "Upon completion of data transmission", the processing proceeds to step S1007 without changing the setting for print end notification since the device can give a print end notification regardless of its capability regarding the print check function; in step S1007, the changed setting for the port is recorded in the registry and in step S1008 the port setting change processing is terminated. If it is determined in step S1004 that the timing setting for print end notification is set to "Upon completion of printing", the processing proceeds to step S1005, where a message such as shown in FIG. 15, for example, that notifies the user that the timing setting for the print end notification becomes changed due to impact from other setting changes is displayed; in step S1006, the timing for the print end notification is automatically changed to when transmission ends; in step S1007, the changed setting for the port is recorded in the registry as information for each port and in step S1008 the port setting change processing is terminated.

If the timing setting for print end notification is displayed after the setting has been changed to a setting that does not allow the device to execute the print check function, the related setting becomes grayed out as in FIG. 12 so that the user cannot change the timing setting to "Upon completion of printing", and the setting for print end notification that was set to "Upon completion of printing" is changed to and displayed as "Upon completion of data transmission".

The processing for changing port settings as the second embodiment of the present invention can be realized through the procedure described above.

As described above, there is an effect according to the second embodiment in that when changing other settings that impact the setting for print end notification, the setting for print end notification is automatically changed to a setting that is usable and the user is notified that the setting for print end notification has automatically been changed.

Other Embodiments

In the first and second embodiments, printers are described as printing devices connected to a network of an information processor system, but the present invention is not limited to this and can be applied to information processing systems in which, in addition to printers, copiers and/or multifunctional equipment are connected to a network as printing devices.

Furthermore, the present invention can be applied to a system comprising a plurality of equipment or to a device comprising single equipment. Needless to say, the present invention can be achieved by supplying to the system or the device a medium such as a storage medium storing program codes of software that realize the functions of the embodiments described above, and by having a computer (or a CPU or MPU) of the system or device read and execute the program codes stored on the medium such as a storage medium.

In this case, the program codes themselves that are read from the medium such as a storage medium realize the functions of the embodiments described above, and the medium such as a storage medium that stores the program codes constitute the present invention. The medium such as a storage medium on which to supply the program codes may be a Floppy® disk, hard disk, optical disk, optical magnetic disk, CD-ROM, CD-R, magnetic tape, nonvolatile memory card or ROM. In other embodiments, the program codes may be read by downloading the program codes via a network.

Furthermore, the present invention is applicable not only when the program codes read by the computer are executed to realize the functions of the embodiments, but also when an OS that operates on the computer performs a part or all of the actual processing based on the instructions contained in the program codes and thereby realizes the functions of the embodiments.

Moreover, the present invention is also applicable when the program codes that are read from the medium such as a storage medium are written onto a memory of an expansion board inserted into a computer or of an expansion unit connected to a computer, and a CPU provided on the expansion board or the expansion unit performs a part or all of the actual processing based on the instructions contained in the program codes and thereby realizes the functions of the embodiments.

As described above the embodiments of the present invention are effective in that a user can choose between a setting under which a print end notification is displayed when data transmission to a print device ends and a setting under which a print end notification is displayed when a print device ends printing, based on the difference in capabilities between print devices and a system in terms of their print check function.

Furthermore, the embodiments of the present invention provide an effect that allows the default print end notification setting to be set within the range of usable print end notification settings even when a user does not determine the capability of a print device to be registered with the system.

The embodiments of the present invention are also effective in that when changing other settings that impact the setting for the print end notification, the setting for the print end notification is automatically changed to a setting that makes it usable and can notify the user that the setting for the print end notification has automatically been changed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information processing apparatus that has a port setting function, comprising:
   a referring unit adapted to refer to a print check ability of a designated printing device;
   a discrimination unit adapted to discriminate whether the printing device has the print check ability, in accordance with a reference made by said referring unit;
   a selection unit adapted to allow selection, as a timing for making a print end notification, from (a) upon completion of printing by the printing device and (b) upon completion of data transmission to the printing device, in accordance with a discrimination made by said discrimination unit; and
   a notification unit adapted to make the print end notification, in accordance with the timing selected by said selection unit,
   wherein said selection unit allows the selection of either one of (a) upon completion of printing by the printing device and (b) upon completion of data transmission to the printing device, if said discrimination unit discriminates that the printing device has the print check ability, or allows the selection of (b) upon completion of data transmission to the printing device, if said discrimination unit discriminates that the printing device does not have the print check ability.

2. An information processing apparatus according to claim 1, wherein the port setting function includes creating a port for outputting data to the printing device and changing a port setting.

3. An information processing apparatus according to claim 1, further comprising a port setting unit adapted to set a port for the print check ability, if said discrimination unit discriminates that the printing device has the print check ability, but the print check ability cannot be executed due to a specified condition.

4. An information processing apparatus according to claim 3, wherein the port for the print check ability set by said port setting unit is a port for the RAW mode.

5. An information processing apparatus according to claim 1, wherein the printing device includes a plurality of printers that are designated in a distributed printing in which a print job is divided and distributed for printing.

6. A method for an information processing apparatus that has a port setting function, the method comprising:
   a referring step of referring to a print check ability of a designated printing device;
   a discriminating step of discriminating whether the printing device has the print check ability, in accordance with a reference made in said referring step;
   a selecting step of selecting, as a timing for making a print end notification, from (a) upon completion of printing by the printing device and (b) upon completion of data transmission to the printing device, in accordance with a discrimination made in discriminating step; and a notification step of making the print end notification, in accordance with the timing selected in said selecting step, wherein said selecting step allows the selection of either one of (a) upon completion of printing by the printing device and (b) upon completion of data transmission to the printing device, if the discriminating step discriminates that the printing device has the print check ability, or allows the selection of (b) upon completion of data transmission to the printing device, if said discriminating step discriminates that the printing device does not have the print check ability.

7. A method according to claim 6, wherein the port setting function includes creating a port for outputting data to the printing device and changing a port setting.

8. A method according to claim 6, further comprising a port setting step adapted to set a port for the print check ability, if said discriminating step discriminates that the printing device has the print check ability, but the print check ability cannot be executed due to a specified condition.

9. A method according to claim 8, wherein the port for the print check ability set in said port setting step is a port for the RAW mode.

10. A method according to claim 6, wherein the printing device includes a plurality of printers that are designated in a distributed printing in which a print job is divided and distributed for printing.

11. A computer-readable medium storing a computer program for an information processing apparatus that has a port setting function, said program comprising:

a referring step of referring to a print check ability of a designated printing device;

a discriminating step of discriminating whether the printing device has the print check ability, in accordance with a reference made in said referring step;

a selecting step of selecting, as a timing for making a print end notification, from (a) upon completion of printing by the printing device and (b) upon completion of data transmission to the printing device, in accordance with a discrimination made in said discriminating step; and a notification step of making the print end notification, in accordance with the timing selected in said selecting step, wherein said selecting step allows the selection of either one of (a) upon completion of printing by the printing device and (b) upon completion of data transmission to the printing device, if said discriminating step discriminates that the printing device has the print check ability, or allows the selection of (b) upon completion of data transmission to the printing device, if said discriminating step discriminates that the printing device does not have the print check ability.

12. A computer-readable medium storing a computer program according to claim 11, wherein the port setting function includes creating a port for outputting data to the printing device and changing a port setting.

13. A computer-readable medium storing a computer program according to claim 11, further comprising a port setting step adapted to set a port for the print check ability, if said discriminating step discriminates that the printing device has the print check ability, but the print check ability cannot be executed due to a specified condition.

14. A computer-readable medium storing a computer program according to claim 13, wherein the port for the print check ability set in said port setting step is a port for the RAW mode.

15. A computer-readable medium storing a computer program according to claim 11, wherein the printing device includes a plurality of printers that are designated in a distributed printing in which a print job is divided and distributed for printing.

* * * * *